United States Patent [19]

Kamihara et al.

[11] Patent Number: 5,843,321

[45] Date of Patent: Dec. 1, 1998

[54] METHOD OF MANUFACTURING OPTICAL ELEMENT

[75] Inventors: Yasuhiro Kamihara; Hitoshi Ohashi; Ayami Imamura, all of Hachioji, Japan

[73] Assignee: Olympus Optical Company, Ltd., Tokyo, Japan

[21] Appl. No.: 229,664

[22] Filed: Apr. 19, 1994

[30] Foreign Application Priority Data

Apr. 19, 1993 [JP] Japan .................................. 5-091370
Dec. 27, 1993 [JP] Japan .................................. 5-331153

[51] Int. Cl.⁶ ........................................................ B29D 11/00
[52] U.S. Cl. .......................... 216/26; 216/24; 216/89; 216/97; 65/31; 65/61; 65/102; 65/111
[58] Field of Search ............................ 156/643, 663, 156/645, 632, 651, 653; 65/37, 38, 39, 31, 61, 102, 111; 216/96, 97, 88, 89, 24, 26, 52

[56] References Cited

U.S. PATENT DOCUMENTS

| | | | |
|---|---|---|---|
| 4,323,423 | 4/1982 | Schrunk | 156/645 |
| 4,530,736 | 7/1985 | Mutter | 156/643 |
| 4,842,633 | 6/1989 | Kuribayashi et al. | 65/44 |
| 4,874,462 | 10/1989 | Makita et al. | 156/635 |
| 4,936,665 | 6/1990 | Whitney | 350/451 |
| 5,044,706 | 9/1991 | Chen | 359/357 |
| 5,085,496 | 2/1992 | Yoshida et al. | 11/569 |

FOREIGN PATENT DOCUMENTS

| | | |
|---|---|---|
| 3042650 A1 | 5/1981 | Germany . |
| 3841255 A1 | 6/1989 | Germany . |
| 56-113108 | 9/1981 | Japan . |
| 60-155552 | 8/1985 | Japan . |
| 61-27505A | 2/1986 | Japan . |
| 63-293176 | 11/1988 | Japan . |
| 1200925A | 8/1989 | Japan . |
| 1307724A | 12/1989 | Japan . |
| 2304505A | 12/1990 | Japan . |
| 3120501A | 5/1991 | Japan . |
| 92/01973 | 2/1992 | WIPO . |

OTHER PUBLICATIONS

"VLSI Fabrication Principles—Lubicon and Gallium Arsenide"; Ghandi; John Wiley & Sons; N.Y.,© 1983'; pp. 422–424.

"Fundamentals of Optics"; Jenkins et al.; © 1976; McGraw–Hill, Inc., ISBN 0–07–032330–5.

"Optical Technology and Applications", 1986, pp. 90–94 with partial English Translation.

"Optical Technology and Applications", 1986, pp. 90–94.

R. Jones, "Computer–controlled Optical Surfacing with Orbital Tool Motion", *Optical Engineering*, vol. 25, No. 6, Jun. 1986, pp. 785–790.

*Primary Examiner*—R. B. Breneman
*Assistant Examiner*—George Goudreau
*Attorney, Agent, or Firm*—Stevens, Davis, Miller & Mosher, L.L.P.

[57] ABSTRACT

Methods of manufacturing optical elements such as diffraction type lenses, aspherical lenses and diffraction gratings are disclosed. Deposited on a glass substrate is a workpiece film made of a material which can be machined much more easily than the substrate. Then the workpiece film is machined to form a predetermined shape or contour therein. After forming the predetermined shape or contour in the workpiece film, the workpiece film and substrate are subjected to etching to duplicate the predetermined shape or contour formed in the workpiece film into the substrate.

23 Claims, 4 Drawing Sheets

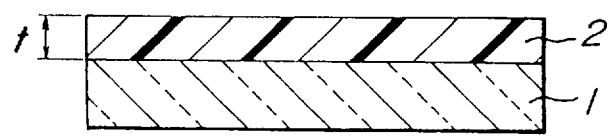
FIG_1A
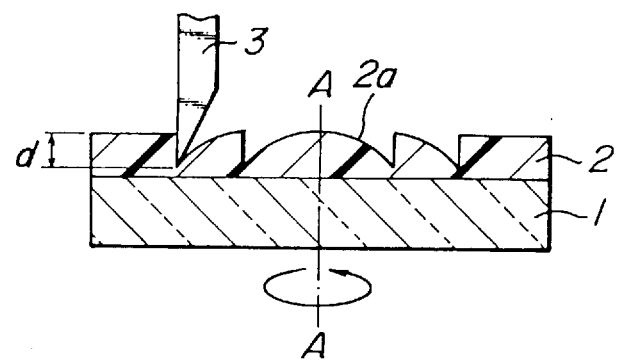
FIG_1B
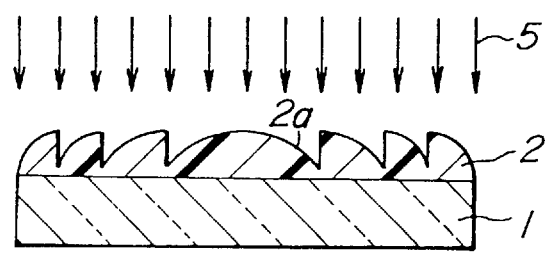
FIG_1C
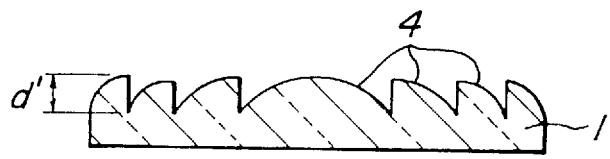
FIG_1D

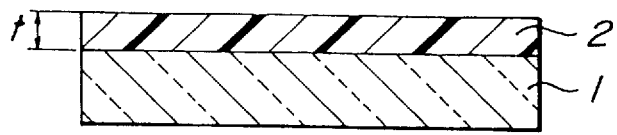
FIG._2A
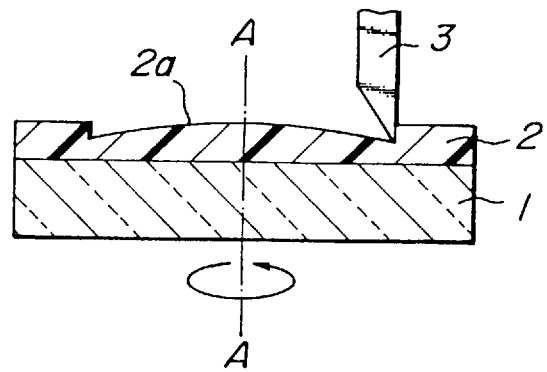
FIG._2B
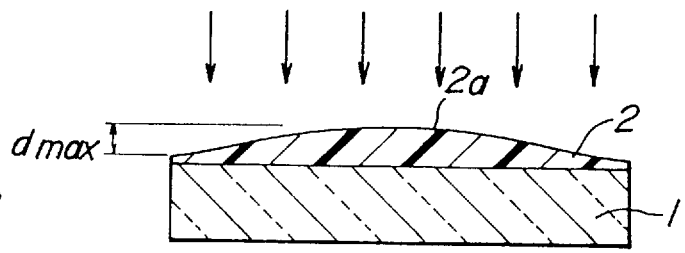
FIG._2C
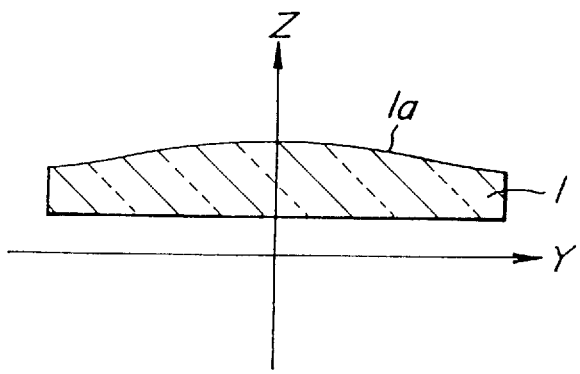
FIG._2D

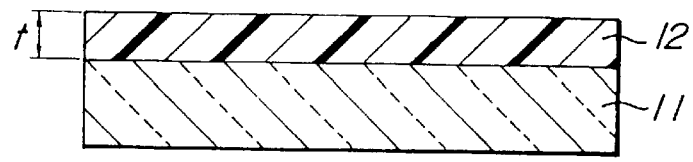
FIG._3A
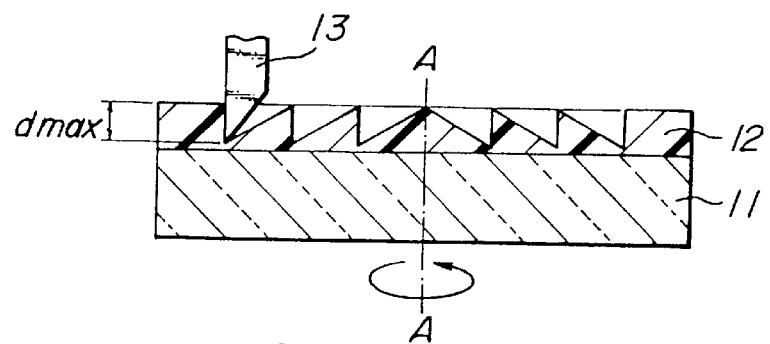
FIG._3B
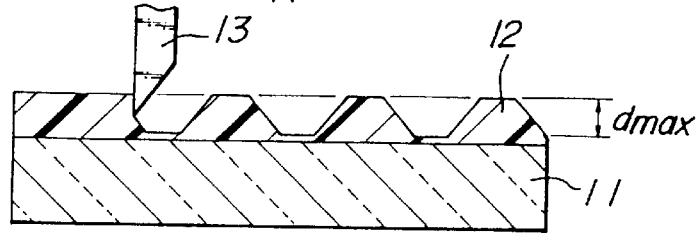
FIG._3C
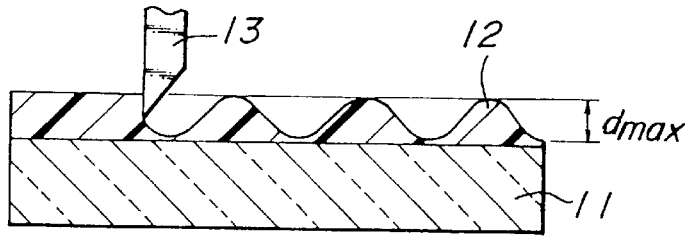
FIG._3D
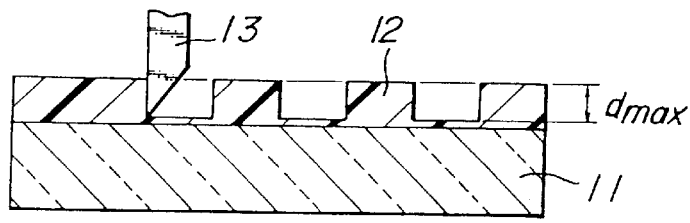
FIG._3E FIG_4A
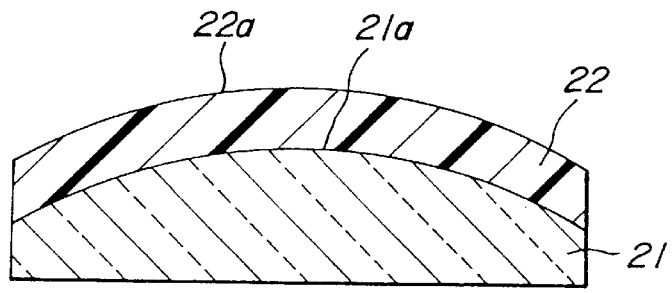
FIG_4B
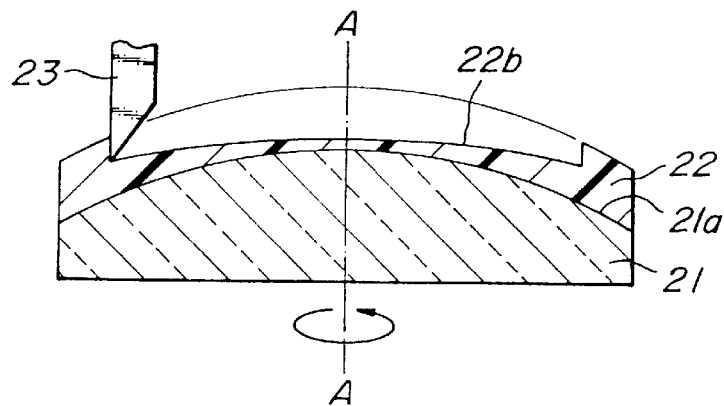

METHOD OF MANUFACTURING OPTICAL ELEMENT

BACKGROUND OF THE INVENTION

1. Field of the Invention

The present invention relates to methods of manufacturing optical elements, and more particularly relates to methods of manufacturing optical elements comprising predetermined shapes or contours formed thereon.

2. Related Art Statements

Recently diffraction type optical elements and aspherical lenses have been used for satisfying a requirement of miniatuarization. For example, diffraction gratings have been widely used as optical low pass filters. Heretofore, there have been proposed various methods of manufacturing such optical elements. These known methods can be summarized as follows.

(a) In Japanese Patent Application Laid-open Publication Kokai Sho 60-103311 (corresponding to U.S. Pat. No. 4,530,736 issued on Jul. 23, 1985), Japanese Patent Application Laid-open Publication Kokai Sho 61-27505 published on Feb. 7, 1986, and Japanese Patent Application Laid-open Publication Kokai Hei 1-307724 published on Dec. 12, 1989, there is described a known method, in which a photoresist film is applied on a substrate made of an optical material, the resist film is subjected to exposure and development to form a desired pattern in the resist film, and then dry etching is performed by using the photoresist pattern as a mask to form a desired pattern in the substrate. In this known method, the desired pattern formed in the resist film is duplicated into the substrate.

(b) In Japanese Patent Application Laid-open Publication Kokai Hei 2-1109 (corresponding to U.S. Pat. No. 4,936,665 issued on Jun. 26, 1990), there is described another known method, in which a photoresist film is applied on a substrate made of an optical material, the resist film is subjected to exposure and development to form a desired pattern in the resist film, and then etching or deposition processes are repeated while masks are changed to form a stepwise structure resembling a blazed configuration in the substrate. Therefore, this method is sometimes called a binary method.

(c) In Japanese Patent Application Laid-open Publication Kokai Hei 3-120501 published on May 22, 1991, there is disclosed another known method, in which a surface of a substrate is directly processed with a ruling engine or lathe to form grating grooves.

(d) In the above mentioned Japanese Patent Application Laid-open Publication Kokai Hei 3-120501, there is further proposed another method, in which grating grooves are directly formed in a surface of a substrate by means of a focused ion beam.

There have been further proposed known methods of manufacturing aspherical lenses as follows.

(e) In Japanese Patent Application Laid-open Publication Kokai Hei 1-200925 published on Aug. 14, 1989, there is disclosed a known method of manufacturing an aspherical lens by a pressing process using glass or plastic material.

(f) In Japanese Patent Application Laid-open Publication Kokai Hei 2-304505 published on Dec. 18, 1990, there is described another known method of manufacturing an aspherical lens, in which an aspherical plastic film is applied on a spherical base lens.

(g) In "COMPUTER-CONTROLLED OPTICAL SURFACING WITH ORBITAL TOOL MOTION", R. A. Jones, OPTICAL ENGINEERING, June 1986, Vol. 25, No. 6, pp. 785 to 790, there is shown still another known method, in which a glass plate is polished into an aspherical surface by means of a numerical control machine.

However, the above mentioned known methods have various drawbacks as will be explained hereinbelow.

In the known method (a), the thickness of a residual portion of the photoresist film is not proportional to the amount of exposing light, so that for instance, if it is required to form a blazed grating configuration in the photoresist film by exposure of an electron beam, the amount of the electron beam exposure has to be controlled precisely in accordance with the characteristics of the photoresist film. This requires that a relationship between intensity of the exposing electron beam and thickness or width of lines should be precisely determined beforehand. Therefore, the electron beam exposing apparatus should be liable and is to be complicated in construction, and expensive in cost thereby. Moreover, it would be difficult to form patterns over a large area.

Further, a fine pattern would be deviated from a predetermined pattern due to the scattering of the exposing beam, even when the exposing beam is such as electron beam, extreme ultraviolet beam, and ultraviolet beam, and thus it is rather difficult to manufacture a diffraction grating element efficiently with high precision.

In the above explained known method (b), a blazed configuration can be obtained only by approximating to a step structure, so that the diffraction efficiency of the thus formed diffractive optical element is not fully higher. In the known method (c), when a glass plate in used as the substrate, a machine tool for cutting a surface of the glass plate should be worn soon, and a machining efficiency is very low so that in order to manufacture a diffraction grating of practically usable size, it requires a very high cost and a very long time. Therefore, this known method is limited to the use of metal substrates which can be easily processed.

In the known method (d), since a beam spot of the focused ion beam has a very small diameter such as of 0.1 $\mu$m, it is possible to perform fine machining. However, this process is affected by an instability of the ion source, and further ion beam could not penetrate into the substrate deeply so that desired depth could not be attained for a short time period. In this manner, the machining speed of the ion beam is extremely slow and the process requires a quite long time.

In the known methods (e) and (f) of manufacturing aspherical lenses, it is necessary to use a very expensive mold, so that a manufacturing cost should be very high. in particular, these methods are not suitable for manufacturing various kinds of optical elements on small scale. In the known method (g), it is necessary to polish glass so that it requires a very long time.

SUMMARY OF THE INVENTION

The present invention has for its object to provide novel and useful methods of manufacturing optical elements in efficient and precise manners.

It is another object of the invention to provide a method of manufacturing optical elements, in which optical elements can be manufactured efficiently, precisely, and easily in a reproductive manner at a low cost.

According to the invention, a method of manufacturing an optical element comprises the steps of:

preparing a substrate made of an optical material and having a surface;

forming a workpiece film on said surface of the substrate;

forming a predetermined shape or contour in said workpiece film by machining; and etching said workpiece film and substrate to form a predetermined shape or contour in the substrate, said predetermined shape or contour corresponding to said predetermined shape or contour formed in the workpiece film.

In this method according to the invention, on the substrate made of an optical material which is hardly machined, there is formed a workpiece film made of a material which can be easily machined such as plastics or resin, and then the workpiece film is machined to form a predetermined shape or contour in the workpiece film. Finally the predetermined shape or contour formed in the workpiece film is transferred or duplicated into the substrate by etching the workpiece film and substrate. This etching can be performed by various etching processes such as dry etching including plasma etching, reactive ion etching and ion beam etching. That is to say, while the assembly of the substrate and workpiece is etched from the workpiece to the surface of the substrate perpendicularly, the predetermined shape or contour formed in the workpiece is transferred or duplicated into the substrate, and thus in the substrate there is formed the desired pattern which is a duplication or similitude of the predetermined shape or contour formed in the workpiece. In this manner, it is possible to form the predetermined shape or contour on the substrate with very high precision of the machining even though the substrate is made of a material which could not be machined easily. It should be noted that the shape or contour formed in the workpiece can be transferred to the substrate accurately by anisotropic etching, and in particular reactive ion etching is most preferable.

According to another aspect of the invention, a method of manufacturing an optical element of transmission type comprises the steps of:

preparing a substrate made of a transparent optical material and having a surface;

forming a workpiece film on said surface of the substrate, said workpiece film being made of a transparent optical material; and subjecting said workpiece to machining to form an optical element having a predetermined shape or contour.

In this method according to the invention, the substrate is made of a transparent optical material such as glass, and the workpiece film is made of a transparent optical material which can be machined much more easily than the substrate. Such a material for the workpiece may be silicon dioxide, $SiO_2$. This workpiece film can be easily machined, so that the predetermined shape or contour can be obtained precisely. In this manner, a diffraction grating having a large size can be manufactured accurately. In particular, when the workpiece film is made of an inorganic substance, it is possible to manufacture a diffraction grating and diffraction type lens having a wide transmission wavelength region, while said optical elements have no or small secular variation, less humidity absorption, and superior resistance against ambient conditions.

BRIEF DESCRIPTION OF THE DRAWINGS

FIGS. 1A to 1D are cross sectional views showing successive steps of the first embodiment of the optical element manufacturing method according to the invention;

FIGS. 2A to 2D are cross sectional views illustrating successive steps of the second embodiment of the method according to the invention;

FIGS. 3A to 3E are cross sectional views depicting successive steps of the third embodiment of the method according to the invention; and FIGS. 4A and 4B are cross sectional views showing successive steps of the fourth embodiment of the method according to the invention.

EXPLANATION OF THE PREFERRED EMBODIMENTS

FIGS. 1A to 1D are cross sectional views showing successive steps of the first embodiment of the method of manufacturing diffractive optical elements according to the invention. In the present embodiment, an optical element in the form of a diffractive lens is to be manufactured. At first, a substrate 1 made of an optical material such as optical glass is prepared and a workpiece film 2 having a thickness of t is formed on a surface of the substrate as illustrated in FIG. 1A. As will be explained later, the thickness t of the workpiece 2 is made slightly larger than the maximum machining depth $d_{max}$. According to the invention, the workpiece film 2 may be made of synthetic resin such as plastics, and in the present embodiment, workpiece film 2 is made of photoresist. Then, the hardness of the workpiece film 2 may be adjusted by suitably setting baking conditions of the photoresist such that the workpiece film 2 can be easily and accurately machined.

Next, as illustrated in FIG. 1B, an assembly of the substrate 1 and workpiece film 2 is set on a driving shaft of a lathe type machine with a numerical control faculty and is rotated about an optical axis A—A. During the rotation, a cutting tool 3 is moved in accordance with the design data of a shape to be formed in the workpiece. Thereby a surface 2a of the workpiece film 2 is machined so as to be the predetermined shape. Since the workpiece 2 is made of resin, it can be machined very easily at a high speed. Further, recent numerical control machines have a very high precision so that submicron machining can be performed and a desired shapes can be obtained with great precision.

When it is assumed that a diffractive lens having nearly a diffraction efficiency of 100% where light is diffracted into a particular order of diffraction is to be formed, a cross sectional shape of each of the concentric rings of the diffractive lens has to be formed as a blazed configuration as depicted in FIG. 1D. In this case, any of the rings has the same depth d'. To realize this, in the step of machining the workpiece film 2 as shown in FIG. 1B, the workpiece is machined such that all rings have the same depth d. On the other hand, when a diffractive lens to be manufactured in supposed to have a plurality of annular zones and the rings in each zone is blazed for a different order of diffraction from the other, it is necessary to make the depths of the rings in each zone different from each other.

Here it is assumed that the maximum depth of the rings formed in the workpiece film 2 is represented by $d_{max}$, the thickness t is not necessary to be equal to $d_{max}$, but may be not less than $d_{max}$. Therefore, when the thickness t of the workpiece film 2 is set to be slightly larger than the maximum machining depth $d_{max}$, the tool 3 can be effectively prevented from being brought into contact with the substrate 1 even though the movement of the tool 3 in the direction of the optical axis contains a small variation or error.

In the blazed configuration, each inclined side 4 of the rings shown in FIG. 1D should have a curves which corresponds to the phase distribution function of the diffractive lens, so that during the process shown in FIG. 1B, it is ideal to machine the workpiece film 2 into the curved configurations. However, in practice, the inclined sides of the rings may be replaced by linear sides, by which the diffraction efficiency of the diffractive lens is very little effected. In the present embodiment, the workpiece film 2 is machined in such a manner that each side of the rings is formed by straight lines. Hence, the machining data can be much simplified and the workability is considerably improved.

After the workpiece film 2 has been machined to form a predetermined shape or contour therein as illustrated in FIG. 1B, anisotropic etching such as reactive ion etching is carried out as shown in FIG. 1C. During this reactive ion etching, the workpiece film 2 and substrate 1 are successively etched and the predetermined shape or contour corresponding to the shape in the workpiece is formed on the substrate 1 as shown in FIG. 1D. In this manner, the diffractive lens shown in FIG. 1D can be manufactured. It should be noted that during the etching process, the workpiece film 2 is completely etched away.

In the present embodiment, as to the etching process of FIG. 1C, the ratio of an etching rate for the workpiece film 2 to an etching rate for the substrate 1 can be changed by adjusting the composition of etching gas 5. For instance, when the above mentioned ratio is set for 1:1, the shape formed in the workpiece film 2 is duplicated in the substrate 1 at a magnification of one in a depth direction and the dimensions of the shape formed in the substrate 1 is identical with those of the shape formed in the workpiece film 2. However, if the above ratio is set for a ratio other than 1:1, the shape in the workpiece film 2 is duplicated in the workpiece at a magnification not equal to one, so that the depth of the duplicated shape becomes larger or smaller than that of the shaped formed in the workpiece 2. Therefore, by adjusting the composition of etching gas 5, it is possible to control the depth of the shape formed in the substrate 1.

As explained above, in the present embodiment, a diffraction type lens having a large area can be manufactured easily and precisely.

It should be noted that the method according to the invention can be applied both to transmission type optical elements and reflection type optical elements. In case of manufacturing a reflection type optical element, after a shape formed in a workpiece film 2 is duplicated into the substrate 1, the surface of the substrate is coated with metal such as chrominum, aluminum and gold to increase the reflectance. In general, the depth of a blazed structure for a transmission type diffractive optical element and a reflection type element is presented by $\lambda m(n-1)$ and $\lambda m/2$, respectively, where m is an order of diffraction, $\lambda$ is a wavelength of incident light, and n is a refractive index of the index of the substrate.

FIGS. 2A to 2D are cross sectional views illustrating successive steps of the second embodiment of the method according to the invention. In the second embodiment, an aspherical lens is formed. At first, a glass substrate 1 having polished surfaces is prepared and a workpiece film 2 made of resin is formed on one surface. The workpiece film 2 has a thickness of t. Also in the present embodiment, the thickness t of the workpiece film 2 is set to be slightly larger than the maximum machining depth $d_{max}$. Then, an assembly of the substrate 1 and workpiece film 2 is set on a lathe machine of numerical control type and a tool 3 is moved in accordance with design data while the assembly is rotated about an optical axis A—A extending perpendicularly to the surface of the substrate 1. In this manner, a surface 2a of the workpiece 2 is cut into a predetermined aspherical surface. Also in the present embodiment, the surface 2a of the workpiece film 2 made of resin can be easily and precisely machined with precision better than a submicron.

Here it is assumed that the aspherical surface 1a is symmetrical with respect to the optical axis A—A, a contour Z of the aspherical surface is generally expressed by the following function of a distance Y (see FIG. 2D).

$$Z = f(Y) \tag{1}$$

In general, an aspherical surface could not be expressed by a simple function, but by a rather complicated function. Therefore, an aspherical surface is often expressed by a polynomial. For instance, the function Z can be expressed by the following series.

$$Z = \frac{cY^2}{1 + [1 - c^2(k+1)Y^2]^{1/2}} + AY^4 + BY^6 + CY^8 \tag{2}$$

wherein Y denoted a distance from the optical axis, c curvature, k constant of the cone, A aspherical coefficient of 4th order, B aspherical coefficient of 6th order and C represents an aspherical coefficient of 8th order.

The number of terms which are taken into consideration can be determined in accordance with the contour of the aspherical surface. In general, a complicated aspherical surface requires a larger number of terms. In the present embodiment, the tool is driven under numerical control and the workpiece film 2 is machined into a predetermined contour.

After the machining process shown in FIG. 2B has been completed, the assembly of the substrate 1 and workpiece film 2 is subjected to an anisotropic etching such as reactive ion etching as shown in FIG. 2C. During this etching process, the aspherical contour of the workpiece film 2 is duplicated into the substrate 1. In this manner, a surface 1a of the substrate 1 is shaped into a predetermined aspherical surface as illustrated in FIG. 2D.

In the present embodiment, the contour of the aspherical surface in the workpiece film 2 is determined by considering a ratio of the etching rate of the workpiece film 2 to the etching rate of the substrate 1. When the aspherical surface is expressed by the equation (1), a difference between the maximum and minimum values of Z becomes equal to the maximum depth $d_{max}$.

As stated above, in the second embodiment, it is possible to manufacture an aspherical lens having a large area in a rapid and precise manner.

In the first and second embodiments so far explained, the workpiece film 2 is completely removed, so that it is not necessary for the workpiece film to be a transparent material.

FIGS. 3A to 3E are cross sectional views depicting successive steps of the third embodiment of the method according to the invention. A substrate 11 made of a transparent optical material is prepared. Both surfaces of the substrate 11 are polished. On one surface of the substrate 11, there is formed a workpiece film 12 as illustrated in FIG. 3A. The workpiece film 12 has a thickness of t and is made of a transparent material which can be machined much more easily than the substrate 11. It should be noted that in the present specification the term "transparent" means that the material has a certain transmissivity for a wavelength or a region of wavelength of light under consideration. For instance, when the optical element is used for visible light, the material should have a certain transmissivity for the visible light. Said transmissivity is not necessarily 100% or near 100%. Further, when the optical element is used for an infrared region of light, the material should have a certain transmissivity for the infrared region of light.

In the present embodiment, the substrate 11 is made of glass and the workpiece film 12 is made of silicon dioxide ($SiO_2$). Next, an assembly of the substrate 11 and workpiece film 12 is set on a machine such as a lathe machine of numerical control type, a milling machine of numerical control type, or a ruling engine type machine and a free surface of the workpiece film 12 is machined with a tool 13 in accordance with design data as depicted in FIGS. 3B to 3E. As stated above, the workpiece film 12 is made of a transparent material which can be more easily machined than the substrate 11, and therefore the workpiece film 12 can be machined into a predetermined shape or contour very easily and precisely without damaging the tool 13. It should be noted that in the present embodiment, the substrate 11 may be made of a material which is very difficult to be machined such as glass. As compared with the first and second embodiments, in the present embodiment, it is no more necessary to duplicate the shape or contour formed in the workpiece film into the substrate so that the predetermined shape or contour can be directly obtained with high precision. In this manner, an optical element can be manufactured with great precision in a reproductive manner.

According to the invention, a workpiece film 12 can be made of an inorganic material by various processes such as sol-gel process, liquid phase deposition (LPD) and chemical vapor deposition (CVD).

When the workpiece film 12 is formed by sol-gel process of silicon dioxide, at first an organosilicon compound such as tetraethoxysilane ($Si(OC_2H_5)_4$) in a solvent such as alcohol. Then, the resulting solution is added to water and a catalyst such as hydrochloric acid is added to perform the hydrolysis and condensation polymerization. During the hydrolysis and condensation, there are produced particles of silicon dioxide and the solution is changed into sol and then gel. The hydrolysis and condensation are carried out in the following process.

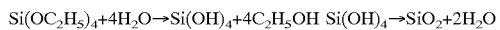

$$Si(OC_2H_5)_4 + 4H_2O \rightarrow Si(OH)_4 + 4C_2H_5OH \quad Si(OH)_4 \rightarrow SiO_2 + 2H_2O$$

Next, a process for forming the workpiece film on the substrate by using sol-gel method mentioned above will be explained. A sol containing tetraethyoxysilane is applied on the surface of the substrate by dip coating process or spin coating process. In this manner, on the surface of the substrate 11 there is formed a gel coating film and this film is dried. During this, the wet gel body is converted into dry gel body. In this manner, the silicon oxide film can be obtained.

By using the above mentioned sol-gel process for forming the workpiece film 12, the materials can be composed at a low temperature as compared with melting method. In sol-gel method, the workpiece film can be formed at a room temperature, but it is preferable to heat the gel coating film. In this case, the higher the heating temperature, the more stable film is obtained. Further, the thickness of the film can be changed by controlling the heating temperature.

According to the invention, the gel coating film may be heated to a temperature within a range of 300°–500° C. The heating can enhance the adhesion of the gel coating film to the substrate. This process is repeated until the workpiece film 12 having a predetermined thickness of t can be obtained. According to the invention, the thus obtained film may be subjected to the heating treatment at a temperature within a range of 500°–800° C. or 800°–1200° C.

Further, high purity can be easily attained and uniform thickness can be realized so that the quality of the workpiece film can be improved. Moreover, many kinds of material can be utilized for the coating process, and thus various kinds of film can be formed.

Next, LPD method will be explained. Now it is assumed to form a workpiece film 12 made of silicon dioxide, silica gel is dissolved in a saturated aqueous solution of $H_2SiF_5$. Then, a reaction starting agent such as an aqueous solution of boric acid is added to the solution and the solution is mixed and agitated well. Then, the substrate 11 is immersed into the solution. In the solution, the following reactions are performed.
a: generation of colloids of silicic acid
b: transportation of colloids in solution
c: condensation polymerization of colloids on substrate surface In this manner, a silicon dioxide film is formed on the surface of the substrate 11. The substrate 11 is immersed in the solution until the silicon dioxide having a predetermined thickness is formed. Next, the silicon dioxide film is heated, if any. When the silicon dioxide is heated, its refractive index is increased. The higher the heating temperature is, the larger the refractive index is, and the refractive index of the silicon dioxide film is close to that of quartz glass. In this manner, by adjusting the heating temperature, the refractive index of the silicon dioxide can be changed.

By LPD method, the workpiece film 12 can be formed at a low temperature and the refractive index of the film can be changed at will. Further, the adhesion of the workpiece film 12 to the substrate is superior and the concentration of impurities in the film can be made very small, and therefore even if the substrate 11 has an irregular surface, it is possible to form the workpiece film 12 having a high quality and small defects. Moreover, the workpiece film 12 has a very high density and the variation in thickness due to heating is small. In this manner, according to LPD method, it is possible to form the workplace film 12 in a precise manner.

Here CVD method will be explained. In CVD method, a gaseous compound is decomposed in a gas phase or on a substrate surface by means of thermal, plasma or photo-radiation energy and a film is deposited on the substrate surface by chemical reaction. There have been proposed thermal CVD, plasma CVD and photo-assisted CVD. In CVD method, the film is formed by the following steps.
a: generation of reactive products in gaseous phase (decomposition)
b: diffusion of reactive products onto substrate surface (transportation)
c: absorption, reaction, diffusion or decoupling on substrate surface (surface reaction)

For instance, in plasma CVD, plasma is generated in a reaction chamber and a raw material gas such as $SiH_4$ is decomposed with the aid of the plasma energy. It should be noted that in the reaction chamber the substrate 11 is placed on an electrode or at such a position through which the plasma flows. In plasma CVD, the decomposed raw material gas components arrive at the substrate surface and the above mentioned reaction c is performed and the workpiece film 12 made of silicon dioxide is deposited on the substrate 11.

In CVD method, a workpiece film 12 made of a substance having a high melting point can be formed at a low temperature in an efficient manner, while uniformity of the film can be attained in regardless with surface conditions of the substrate 11. Further a concentration of impurities in the workpiece film 12 can be decreased easily by using highly pure gases. Moreover, the composition, construction and configuration of the deposited workpiece film 12 can be easily controlled. In this manner, the uniform workpiece film 12 having high purity can be formed at a low temperature.

In thermal CVD method, it is possible to deal with a substrate having a large diameter, and mass production can be effected. By means of the plasma CVD, it is possible to form a thin film having high quality. In particular, by ECR plasma CVD method, the film can be formed at a very high deposition rate so that the workpiece film 12 can be formed efficiently at a low temperature. By photo-assisted CVD method, it is possible to select an excited state-decomposition path, and further damage of the substrate due to impact or ions can be prevented unless the wavelength of the photoradiation is so short as to cause photo-ionization. Thereby it is possible to form the workpiece film 12 having high quality.

In the manner explained above, the workpiece film 12 having high quality and a thickness of t can be formed on the substrate 11 at a low temperature. In the manner explained above, according to the invention the workpiece film made of inorganic material can be formed by either of sol-gel method, LPD method or CVD method, and the thus formed workpiece film can be easily and precisely machined. It should be noted that the workpiece film 12 formed by the above explained sol-gel method, CVD method or LPD method can be used as it is. However, it is preferable in case to subject the thus deposited workpiece film 12 to the heating process at a high temperature. In this case, by suitably controlling the heating temperature, it is possible to adjust the refractive index of the workpiece.

Here the step of machining the workpiece film 12 to form a predetermined shape or contour in the workpiece film will be explained. At first, in the case of forming a diffractive optical element composed of concentric grooves such as diffraction type lens, an assembly of the substrate 11 and workpiece film 12 is fixed to the spindle of a cutting machine and is rotated about an optical axis A—A as illustrated in FIG. 3B. During the rotation of the assembly, a tool 13 is moved in accordance with the design data of a diffraction type lens to be formed, and the workpiece film 12 is machined into a predetermined shape. According to the invention, the workpiece film 12 is made of material which can be machined much more easily than the substrate 11, and therefore the workpiece film 12 can be easily, rapidly and precisely machined.

In the case of manufacturing diffractive type optical elements having straight line grooves such as diffraction gratings, either the tool 13 or the assembly of the substrate 11 and workpiece film 12 is moved in X-Y directions while the other is fixed, and the workpiece film 12 is machined into a predetermined shape as illustrated in FIGS. 3C to 3E. In this manner, a diffraction grating can be manufactured easily and precisely.

As explained above, when a workpiece film 12 is made of an inorganic material which is substantially free from secular variation and has small moisture absorption, a diffractive optical element having high precision and high durability can be obtained easily. Further, the inorganic material has a relatively high transmissivity over a wider wavelength range than the organic material, so that the diffractive optical element can be utilized for a wide wavelength range. Moreover, when the substrate 11 and workpiece film 12 are made of materials having the same composition, for instance when the substrate is made of quartz glass and the workplace film 12 is made of silicon oxide, the workpiece film can be effectively coupled with the substrate and further they have similar refractive indices, the reflection at their boundary surface can be suppressed so that the transmissivity of the optical element can be improved.

FIGS. 4A and 4B are cross sectional views showing successive steps of the fourth embodiment of the method according to the invention. In the present embodiment, an aspherical lens is to be formed. At first, a substrate 21 made of transparent glass is prepared. A surface 21a may be spherical or plane though it is drawn as being spherical in FIG. 4A. On this surface 21a of the substrate 21, there is formed a workpiece film 22 by means of one of the methods explained above. A surface 22a of the workplace film 22 has a contour corresponding to the surface 21a of the substrate 21. Then, an assembly of the glass substrate 21 and workpiece film 22 is fixed to a spindle of a lathe and is rotated about an optical axis A—A as shown in FIG. 4B. A tool 23 is moved in accordance with the design data for obtaining the aspherical surface to be formed so that the workpiece film 22 is machined into the predetermined aspherical contour 22b.

In this manner, an aspherical lens having a predetermined aspherical contour 22b can be obtained in an easy and precise manner.

The present invention is not limited to the embodiments explained above, but many modifications and alternations may be conceived by those skilled in the art within the scope of the invention. For instance, the opposite surface of the substrate may be machined into an aspherical shape by the same processes for manufacturing the aspherical surface 1a. Then it is possible to obtain an optical element whose both surfaces are formed into the predetermined aspherical polished. Further, the other surface of the substrate 1 may be polished by the common process to form a spherical surface. Consequently, an optical element having aspherical and spherical surfaces can be obtained. Further, a spherical lens may be manufactured by the method of the second embodiment.

In the third and fourth embodiments, the workpiece film is made of inorganic material, but it may be made of a transparent organic material such as transparent plastics.

What is claimed is:

1. A method of manufacturing an optical element, said method comprising the steps of:

preparing a substrate having a surface;

forming a workpiece film on said surface of the substrate, said workpiece film being made of a material which is less resistant to mechanical machining than said substrate;

mechanically machining said workpiece film to form a shape or contour therein; and etching said workpiece film and substrate to form a shape or contour in the substrate, said shape or contour formed in said substrate corresponding to said shape or contour formed in the workpiece film.

2. A method according to claim 1, wherein said workpiece film is made of a material selected from a group consisting of resin and metal.

3. A method according to claim 1, wherein said substrate is made of a glass and said workpiece film is made of a material selected from a group consisting of resin and metal.

4. A method according to claim 1, wherein said etching step is performed by an anisotropic etching.

5. A method according to claim 4, wherein said anisotropic etching is a reactive ion etching.

6. A method of manufacturing an optical element of transmission type, said method comprising the steps of:

preparing a substrate made of a first transparent optical material and having a surface;

forming a workpiece film on said surface of the substrate, said workpiece film being made of a second transparent optical material which is less resistant to mechanical machining than said substrate; and mechanically machining said workpiece film to form said optical element to have a shape or contour.

7. A method according to claim 6, wherein said workpiece film is made of an inorganic substance.

8. A method according to claim 7, wherein said workpiece film made of the inorganic substance is formed by a sol-gel method.

9. A method according to claim 7, wherein said workpiece film made of the inorganic substance is formed by liquid phase deposition (LPD) method.

10. A method according to claim 7, wherein said workpiece film is formed by chemical vapor deposition (CVD).

11. A method according to claim 6, wherein after the machining step, the assembly of the substrate and workpiece film is heated at a temperature higher than a room temperature.

12. A method according to claim 7, wherein after the machining step, the assembly of the substrate and workplace film is heated at a temperature higher than room temperature.

13. A method according to claim 8, wherein after the machining step, the assembly of the substrate and workplace film is heated at a temperature higher than room temperature.

14. A method according to claim 9, wherein after the machining step, the assembly of the substrate and workplace film is heated at a temperature higher than room temperature.

15. A method according to claim 10, wherein after the machining step, the assembly of the substrate and workplace film is heated at a temperature higher than room temperature.

16. A method according to claim 1, wherein the shape or contour formed in the workpiece film is a shape or contour of a diffractive element.

17. A method according to claim 16, wherein the diffractive element is a diffractive lens.

18. A method according to claim 1, wherein the shape of contour formed in the workpiece film is a shape or contour of an aspherical lens.

19. A method according to claim 6, wherein the shape or contour formed in the workpiece film is a shape or contour of a diffractive element.

20. A method according to claim 19, wherein the diffractive element is a diffractive lens.

21. A method according to claim 6, wherein the shape or contour formed in the workpiece film is a shape or contour of an aspherical lens.

22. A method according to claim 1, wherein said step of mechanically machining is performed by mechanical cutting.

23. A method according to claim 6, wherein said step of mechanically machining is performed by mechanical cutting.

* * * * *